United States Patent Office 2,772,144
Patented Nov. 27, 1956

2,772,144
PRODUCTION OF SULPHURYL FLUORIDE

Leon Jerzy Belf, Bristol, England, assignor to The National Smelting Company Limited, London, England No Drawing. Application August 25, 1953,
Serial No. 376,511

Claims priority, application Great Britain August 29, 1952

2 Claims. (Cl. 23—203)

This invention relates to the production of sulphuryl fluoride.

Previously sulphuryl fluoride has been produced by two methods:

(1) the combination of sulphur dioxide and elementary fluorine. The reaction is, however, difficult to control;

(2) the thermal decomposition of barium fluosulphonate. This salt, however, has itself to be obtained by additional processes.

It is an object of the invention to provide a one-stage process for producing sulphuryl fluoride which is easy to carry out and, because of the single stage, is very economical.

According to the present invention sulphuryl chloride gas and hydrogen fluoride gas are passed simultaneously over a catalyst such as activated charcoal.

Sulphur dioxide gas and chlorine gas can be used instead of sulphuryl chloride gas as they will combine to form this in contact with the catalyst.

Sulphuryl fluoride is produced in good yield by the following reactions:

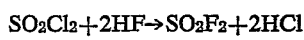
$SO_2Cl_2 + 2HF \rightarrow SO_2F_2 + 2HCl$ or

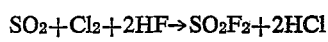
$SO_2 + Cl_2 + 2HF \rightarrow SO_2F_2 + 2HCl$

The reaction temperature may be maintained at 350–450° C. preferably around 400° C., and the pressure is conveniently from 1–100 atmospheres (high pressures reduce the tendency of sulphuryl chloride to decompose into sulphur dioxide and chlorine and thus increase the rate of formation of sulphuryl fluoride).

The crude sulphuryl fluoride produced by the reactions as shown above is purified.

In an example sulphur dioxide, chlorine and 20% excess hydrogen fluoride were passed simultaneously over a catalyst consisting of activated charcoal. The temperature of the reactor was 400° C., and the pressure was atmospheric. The nominal contact time i. e. the time which the reactants can be considered to spend in the reactor, based on the assumption that there is no volume change from reactants to products, was 30 secs. The gases were passed through the reactor at the rate of 100 litres/hour.

The gases leaving the reactor consisted of sulphuryl fluoride, hydrogen chloride and unreacted hydrogen fluoride, sulphur dioxide, chlorine and sulphuryl chloride. They were scrubbed with water, the acidic components in the gases thus being largely removed. The gases leaving the scrubber were collected in traps maintained at low temperatures, the first trap being cooled in ice, the second and third being kept at −20° C., and the fourth trap being cooled in a mixture of solid carbon dioxide and alcohol kept at −78° C. The crude low-boiling product was distilled in a Podbielniak-type still. The molecular weight, boiling point and freezing point of the pure product were found to be 101.5, −51° C., and −125° C. respectively.

Various modifications may be made within the scope of the invention.

1. The method of producing sulphuryl fluoride by reaction between sulphuryl chloride gas and hydrogen fluoride gas comprising simultaneously passing said gases over activated charcoal while maintaining the reaction temperature at about 350 to 450° C., and recovering sulphuryl fluoride from the resulting gaseous product.

2. The method according to claim 1 wherein the reaction is carried out at a pressure of from 1 to 100 atmospheres.

References Cited in the file of this patent

UNITED STATES PATENTS

| | | |
|---|---|---|
| 1,765,688 | McKee et al. | June 24, 1930 |
| 1,917,228 | Bacon et al. | July 11, 1933 |
| 2,431,880 | Merz | Dec. 2, 1947 |
| 2,562,432 | Gilman | July 31, 1951 |

OTHER REFERENCES

Ind. and Eng. Chemistry, Nov. 1950, page 2225.
Jour. Am. Chem. Society 72, 919–21 (1950).
Chem. Abs., vol. 44, 7178i (1950).